United States Patent
Mahaffey et al.

(10) Patent No.: US 9,003,057 B2
(45) Date of Patent: Apr. 7, 2015

(54) SYSTEM AND METHOD FOR EXCHANGING INFORMATION IN A MOBILE WIRELESS NETWORK ENVIRONMENT

(75) Inventors: Gary B. Mahaffey, Gilroy, CA (US); Jayaraman R. Iyer, San Jose, CA (US); Michel Khouderchah, Cupertino, CA (US); Kent K. Leung, Palo Alto, CA (US); Robert A. Mackie, Cary, NC (US); Timothy P. Stammers, Raleigh, NC (US); Hy Quoc Pham, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 12/984,034

(22) Filed: Jan. 4, 2011

(65) Prior Publication Data

US 2012/0173661 A1     Jul. 5, 2012

(51) Int. Cl.
*H04L 29/06* (2006.01)
*H04W 76/02* (2009.01)
*H04L 29/08* (2006.01)

(52) U.S. Cl.
CPC .............. *H04W 76/02* (2013.01); *H04L 67/14* (2013.01)

(58) Field of Classification Search
CPC .. H04W 40/00; H04L 45/308; H04L 12/5689
USPC .......... 370/216, 238, 352, 396, 428; 709/203, 709/226, 242; 726/11
See application file for complete search history.

(56) References Cited

U.S. PATENT DOCUMENTS

| | | | |
|---|---|---|---|
| 5,151,899 | A | 9/1992 | Thomas et al. |
| 5,371,731 | A | 12/1994 | Pratt et al. |
| 5,898,713 | A | 4/1999 | Melzer et al. |
| 6,496,516 | B1 | 12/2002 | Dabecki et al. |
| 6,522,880 | B1 | 2/2003 | Verma et al. |
| 6,643,621 | B1 | 11/2003 | Dodrill et al. |
| 6,654,792 | B1 | 11/2003 | Verma et al. |
| 6,684,256 | B1 | 1/2004 | Warrier et al. |

(Continued)

FOREIGN PATENT DOCUMENTS

| | | |
|---|---|---|
| EP | 1250022 | 10/2002 |
| EP | 1619917 | 1/2006 |

(Continued)

OTHER PUBLICATIONS

PCT Mar. 1, 2011 Notification of Transmittal (1 page) of the International Search Report (4 pages) and the Written Opinion of the International Searching Authority, or the Declaration (6 pages) for PCT/US2010/054834.

(Continued)

*Primary Examiner* — Andrew Nalven
*Assistant Examiner* — Huan V Doan
(74) *Attorney, Agent, or Firm* — Patent Capital Group

(57) ABSTRACT

A method is provided in one example embodiment and includes communicating a message to a remote data plane element in order to request a data plane resource for hosting a session. The method also includes receiving a response at a network element acknowledging the message. Data plane traffic is managed at the remote data plane element based on enforcement rules. The enforcement rules are provisioned in a table element at the remote data plane element, and the table element reflects a portion of a master table element included in the network element.

21 Claims, 8 Drawing Sheets

(56) References Cited

U.S. PATENT DOCUMENTS

| | | |
|---|---|---|
| 6,728,266 B1 | 4/2004 | Sabry et al. |
| 6,829,242 B2 | 12/2004 | Davison et al. |
| 6,839,767 B1 | 1/2005 | Davies et al. |
| 6,862,624 B2 * | 3/2005 | Colby et al. .................. 709/226 |
| 6,917,592 B1 | 7/2005 | Ramankutty et al. |
| 6,922,411 B1 | 7/2005 | Taylor |
| 6,968,389 B1 | 11/2005 | Menditto et al. |
| 7,317,693 B1 | 1/2008 | Roesch et al. |
| 7,366,189 B2 | 4/2008 | Davison et al. |
| 7,426,202 B2 | 9/2008 | Warrier et al. |
| 7,447,765 B2 | 11/2008 | Aerrabotu et al. |
| 7,496,662 B1 | 2/2009 | Roesch et al. |
| 7,502,836 B1 | 3/2009 | Menditto et al. |
| 7,522,521 B2 | 4/2009 | Bettink et al. |
| 7,610,330 B1 | 10/2009 | Quinn et al. |
| 7,673,072 B2 | 3/2010 | Boucher et al. |
| 7,742,399 B2 | 6/2010 | Pun |
| 7,768,983 B2 | 8/2010 | Nylander et al. |
| 7,792,113 B1 | 9/2010 | Foschiano et al. |
| 7,808,919 B2 | 10/2010 | Nadeau et al. |
| 7,827,256 B2 | 11/2010 | Phillips et al. |
| 7,856,512 B2 | 12/2010 | Hilla et al. |
| 7,885,248 B2 | 2/2011 | Harper et al. |
| 7,885,260 B2 | 2/2011 | Paul et al. |
| 7,890,636 B2 | 2/2011 | Grayson et al. |
| 7,925,709 B1 | 4/2011 | Ben-Yoseph et al. |
| 7,926,071 B2 | 4/2011 | Stephens et al. |
| 7,929,442 B2 | 4/2011 | Connor et al. |
| 7,990,993 B1 * | 8/2011 | Ghosh et al. .................. 370/428 |
| 8,018,866 B1 | 9/2011 | Kasturi et al. |
| 8,086,253 B1 | 12/2011 | Kalmkar et al. |
| 8,279,776 B1 | 10/2012 | Everson et al. |
| 8,339,959 B1 | 12/2012 | Moisand et al. |
| 2002/0046264 A1 | 4/2002 | Dillon et al. |
| 2002/0053029 A1 | 5/2002 | Nakamura et al. |
| 2003/0028433 A1 | 2/2003 | Merriman et al. |
| 2003/0028644 A1 | 2/2003 | Maguire et al. |
| 2003/0039237 A1 | 2/2003 | Forslow |
| 2003/0058872 A1 | 3/2003 | Berggreen et al. |
| 2003/0097481 A1 | 5/2003 | Richter |
| 2004/0054925 A1 | 3/2004 | Etheridge et al. |
| 2004/0088385 A1 | 5/2004 | Blanchet et al. |
| 2004/0224678 A1 | 11/2004 | Dahod et al. |
| 2004/0236855 A1 | 11/2004 | Peles |
| 2005/0013253 A1 * | 1/2005 | Lindskog et al. ............. 370/238 |
| 2005/0025152 A1 | 2/2005 | Georgiou et al. |
| 2005/0058153 A1 | 3/2005 | Santhoff et al. |
| 2005/0074005 A1 | 4/2005 | Okuno |
| 2005/0088974 A1 | 4/2005 | Savoor et al. |
| 2005/0091371 A1 | 4/2005 | Delegue et al. |
| 2005/0096016 A1 | 5/2005 | Tervo et al. |
| 2005/0120091 A1 | 6/2005 | Casais et al. |
| 2005/0147069 A1 | 7/2005 | Rink et al. |
| 2005/0239473 A1 | 10/2005 | Pan et al. |
| 2005/0246346 A1 | 11/2005 | Gerdes et al. |
| 2005/0286504 A1 | 12/2005 | Kwon |
| 2006/0018328 A1 | 1/2006 | Mody et al. |
| 2006/0029084 A1 | 2/2006 | Grayson |
| 2006/0058021 A1 | 3/2006 | Fox et al. |
| 2006/0098573 A1 | 5/2006 | Beer et al. |
| 2006/0164992 A1 | 7/2006 | Brown et al. |
| 2006/0222086 A1 | 10/2006 | Frye |
| 2006/0224750 A1 | 10/2006 | Davies et al. |
| 2006/0234678 A1 | 10/2006 | Juitt et al. |
| 2006/0256722 A1 | 11/2006 | Taha et al. |
| 2006/0268901 A1 | 11/2006 | Choyi et al. |
| 2006/0291388 A1 | 12/2006 | Amdahl et al. |
| 2007/0014245 A1 | 1/2007 | Aloni et al. |
| 2007/0027992 A1 | 2/2007 | Judge et al. |
| 2007/0067839 A1 | 3/2007 | Hamada et al. |
| 2007/0078955 A1 | 4/2007 | Siliquini et al. |
| 2007/0097983 A1 | 5/2007 | Nylander et al. |
| 2007/0101421 A1 | 5/2007 | Wesinger et al. |
| 2007/0105568 A1 | 5/2007 | Nylander et al. |
| 2007/0116019 A1 | 5/2007 | Cheever et al. |
| 2007/0116020 A1 | 5/2007 | Cheever et al. |
| 2007/0201383 A1 | 8/2007 | Ong et al. |
| 2007/0208820 A1 | 9/2007 | Makhervaks et al. |
| 2007/0243872 A1 | 10/2007 | Gallagher et al. |
| 2007/0253328 A1 | 11/2007 | Harper et al. |
| 2007/0271453 A1 | 11/2007 | Pohja et al. |
| 2007/0298848 A1 | 12/2007 | Babin |
| 2008/0010354 A1 | 1/2008 | Sasaki et al. |
| 2008/0026740 A1 | 1/2008 | Netanel |
| 2008/0045267 A1 | 2/2008 | Hind et al. |
| 2008/0114862 A1 | 5/2008 | Moghaddam et al. |
| 2008/0133518 A1 | 6/2008 | Kapoor et al. |
| 2008/0137541 A1 | 6/2008 | Agarwal et al. |
| 2008/0147837 A1 | 6/2008 | Klein et al. |
| 2008/0162637 A1 | 7/2008 | Adamczyk et al. |
| 2008/0176582 A1 | 7/2008 | Ghai et al. |
| 2008/0177880 A1 * | 7/2008 | Ginis .......................... 709/226 |
| 2008/0188223 A1 | 8/2008 | Vesterinen et al. |
| 2008/0298309 A1 | 12/2008 | Dahod et al. |
| 2008/0310404 A1 | 12/2008 | Valme et al. |
| 2008/0316980 A1 | 12/2008 | Ahlen et al. |
| 2009/0017864 A1 | 1/2009 | Keevill et al. |
| 2009/0061821 A1 | 3/2009 | Chen et al. |
| 2009/0061873 A1 | 3/2009 | Bao et al. |
| 2009/0067417 A1 | 3/2009 | Kalavade et al. |
| 2009/0086742 A1 | 4/2009 | Ghai et al. |
| 2009/0089447 A1 | 4/2009 | Balachandran et al. |
| 2009/0092136 A1 | 4/2009 | Nazareth et al. |
| 2009/0098872 A1 | 4/2009 | Deshpande et al. |
| 2009/0109849 A1 | 4/2009 | Wood et al. |
| 2009/0109982 A1 | 4/2009 | Batz et al. |
| 2009/0129271 A1 * | 5/2009 | Ramankutty et al. ......... 370/235 |
| 2009/0156213 A1 | 6/2009 | Spinelli et al. |
| 2009/0161680 A1 | 6/2009 | Ishikawa et al. |
| 2009/0164597 A1 | 6/2009 | Shuster |
| 2009/0207759 A1 | 8/2009 | Andreasen et al. |
| 2009/0215438 A1 | 8/2009 | Mittal et al. |
| 2009/0254658 A1 | 10/2009 | Kamikura et al. |
| 2009/0262682 A1 | 10/2009 | Khetawat et al. |
| 2009/0279522 A1 | 11/2009 | Leroy et al. |
| 2009/0286510 A1 | 11/2009 | Huber et al. |
| 2010/0010991 A1 | 1/2010 | Joshi |
| 2010/0067462 A1 | 3/2010 | Beser et al. |
| 2010/0077102 A1 | 3/2010 | Lim et al. |
| 2010/0091653 A1 | 4/2010 | Koodli et al. |
| 2010/0091775 A1 | 4/2010 | Yamamoto |
| 2010/0103871 A1 | 4/2010 | Mooney et al. |
| 2010/0124933 A1 | 5/2010 | Chowdhury et al. |
| 2010/0131646 A1 | 5/2010 | Drako |
| 2010/0174829 A1 | 7/2010 | Drako |
| 2010/0186064 A1 | 7/2010 | Huang et al. |
| 2010/0195640 A1 | 8/2010 | Park et al. |
| 2010/0278070 A1 | 11/2010 | Melia et al. |
| 2010/0291897 A1 | 11/2010 | Ghai et al. |
| 2011/0021192 A1 | 1/2011 | Grayson et al. |
| 2011/0021196 A1 | 1/2011 | Grayson et al. |
| 2011/0058479 A1 | 3/2011 | Chowdhury et al. |
| 2011/0069663 A1 | 3/2011 | Shu et al. |
| 2011/0075557 A1 | 3/2011 | Chowdhury et al. |
| 2011/0075675 A1 | 3/2011 | Koodli et al. |
| 2011/0076985 A1 | 3/2011 | Chami et al. |
| 2011/0116377 A1 | 5/2011 | Batz et al. |
| 2011/0122870 A1 | 5/2011 | Dixon et al. |
| 2011/0145103 A1 | 6/2011 | Ljunggren et al. |
| 2011/0145111 A1 | 6/2011 | Ljunggren et al. |
| 2011/0182249 A1 | 7/2011 | Yang et al. |
| 2011/0185049 A1 | 7/2011 | Atreya et al. |
| 2011/0225284 A1 | 9/2011 | Savolainen |
| 2011/0235546 A1 | 9/2011 | Horn et al. |
| 2011/0235595 A1 | 9/2011 | Mehta et al. |
| 2011/0295942 A1 | 12/2011 | Raghunath et al. |
| 2012/0002543 A1 | 1/2012 | Dighe et al. |
| 2012/0076120 A1 | 3/2012 | Kovvali et al. |
| 2012/0082073 A1 | 4/2012 | Andreasen et al. |
| 2012/0082093 A1 | 4/2012 | Andreasen et al. |
| 2012/0082094 A1 | 4/2012 | Andreasen et al. |
| 2012/0082132 A1 | 4/2012 | Andreasen et al. |
| 2012/0082146 A1 | 4/2012 | Andreasen et al. |
| 2012/0082161 A1 | 4/2012 | Leung et al. |

(56) References Cited

U.S. PATENT DOCUMENTS

| | | | |
|---|---|---|---|
| 2012/0184258 | A1 | 7/2012 | Kovvali et al. |
| 2012/0224536 | A1 | 9/2012 | Hahn et al. |
| 2013/0003741 | A1 | 1/2013 | Singh et al. |
| 2013/0041934 | A1 | 2/2013 | Annamalaisami et al. |
| 2013/0058274 | A1 | 3/2013 | Scherzer et al. |
| 2013/0258963 | A1 | 10/2013 | Mihaly et al. |

FOREIGN PATENT DOCUMENTS

| | | |
|---|---|---|
| EP | 1978685 | 10/2008 |
| WO | WO 92/07438 | 4/1992 |
| WO | WO 92/14327 | 8/1992 |
| WO | WO2005/015825 | 2/2005 |
| WO | WO 2009/089455 | 7/2009 |
| WO | WO2009/132700 | 11/2009 |
| WO | WO2011/062745 | 5/2011 |
| WO | WO2011/062746 | 5/2011 |

OTHER PUBLICATIONS

PCT May 31, 2012 International Preliminary Report on Patentability and Written Opinion of the International Searching Authority (8 pages) for PCT/US2010/054834.
PCT Feb. 8, 2011 Notification of Transmittal (1 page) of the International Search Report (4 pages) and the Written Opinion of the International Searching Authority, or the Declaration (7 pages) for PCT/US2010/054838.
PCT May 30, 2012 International Preliminary Report on Patentability and Written Opinion of the International Searching Authority (8 pages) for PCT/US2010/054838.
Cisco Systems, Inc., "Cisco NAC Appliance—Clean Access Manager Installation and Configuration Guide," Jul. 2009, 5 pages http://www.cisco.com/en/US/docs/securty/nac/appliance/configuration_guide/461/cam/cam461ug.pdf.
Cisco Systems, Inc., "Cisco NAC Appliance—Clean Access Server Installation and Configuration Guide, Rel. 4.6 (1)," Jul. 2009, 3 pages http://www.cisco.com/en/US/docs/security/nac/appliance/configuration_guide/461/cas/cas461ug.pdf.
"3GPP TS 23.203 V9.2.0 (Sep. 2009) Technical Specification 3rd Generation Partnership project; Technical Specification Group Services and System Aspects; Policy and Charging Control Architecture (Release 9)," 3GPP TS 23.203 V9.2.0, vol. 23, 203, No. V9.2.0; Sep. 1, 2009, 120 pages URL:ftp://ftp.3.gpp.org/specs/archive/23_series/23.203/.
EPO Aug. 22, 2012 Response to Communication re Rules 161(1) and 162 EPC from European Application No. 10779130; 8 pages.
Ericsson, Tdoc S2-000888, "SGSN decomposition," Document for discussion; R000 Architecture; 3GPP TSG SA2 Meeting #13; Berlin, May 22-26, 2000, 13 pages; http://www.3gpp.org/ftp/tsg_sa/WG2_Arch/TSGS2_13/tdocs/S2-000888.zip.
U.S. Appl. No. 12/642,790, filed Dec. 19, 2009, entitled "System and Method for Managing Out of Order Packets in a Network Environment," Inventor(s): Walter Dixon et al.
U.S. Appl. No. 12/621,114, filed Nov. 18, 2009, entitled "System and Method for Inspecting Domain Name System Flows in a Network Environment," Inventor(s): Robert Batz et al.
U.S. Appl. No. 12/642,791, filed Dec. 19, 2009, entitled "System and Method for Providing Subscriber Aware Routing in a Network Environment," Inventor(s): Shmuel Shaffer.
U.S. Appl. No. 13/159,906, filed Jun. 14, 2011, entitled "Selective Packet Sequence Acceleration in a Network Environment," Inventor(s): Bhagatram Janarthanan et al.
U.S. Appl. No. 13/160,189, filed Jun. 14, 2011, entitled "Preserving Sequencing During Selective Packet Acceleration in a Network Environment," Inventor(s): Bhagatram Janarthanan et al.
U.S. Appl. No. 13/160,344, filed Jun. 14, 2011, entitled "Accelerated Processing of Aggregate Data Flows in a Network Environment," Inventor(s): Imnaz Meher Jilani et al.
U.S. Appl. No. 13/160,426, filed Jun. 14, 2011, entitled "Selective Packet Sequence Acceleration in a Network Environment," Inventor(s): Bhagatram Janarthanan.
3GPP TR 25.820 v8.0.0 (Mar. 2008), 3rd Generation Partnership Project; Technical Specification Group Radio Access Networks; 3G Home NodeB Study Item Technical Report (Release 8); http://www.3gpp.org, 2008. 37 pages.
3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.
3GPP TS 22.011 v8.4.1 (Jun. 2008), 3rd Generation Partnership Project; Technical Specification Group Services and System Aspects; Service accessibility (Release 8), Global System for Mobile Communications, http://www/3gpp.org, 2008. 25 pages.
3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.
3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.
3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.
3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.
3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.
3GPP TS 25.411 v7.1.0 (Sep. 2007); 3rd Generation Partnership Project; Technical Specification Group Radio Access Network; UTRAN lu interface layer 1 (Release 7), http://www.3gpp.org, 2007. 9 pages.
3GPP TS 25.413 V7.8.0 (Dec. 2007), 3rd Generation Partnership Project; Technical Specification Group Radio Access Network; UTRAN lu interface RANAP signaling (Release 7), http://www.3gpp.org, 2007. 359 pages.
3GPP TS 25.415 v7.3.0 (Dec. 2006), 3rd Generation Partnership Project; Technical Specification Group Radio Access Network; UTRAN lu interface user plane protocols (Release 7), http://www.3gpp.org, 2006. 64 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.
3GPP TS 29.234 v7.9.0 (Jun. 2008), 3rd Generation Partnership Project; Technical Specification Group Core Network and Terminals; 3GPP system to Wireless Local Area Network (WLAN) interworking; Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.
3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.
3GPP TS 29.415 v8.0.0 (May 2008), 3rd Generation Partnership Project; Technical Specification Group Core Network and Terminals;

(56) References Cited

OTHER PUBLICATIONS

Core Network Nb Interface User Plane Protocols (Release 8), Global System for Mobile Communications, http://www.3gpp.org, 2008. 14 pages.

"3rd Generation Partnership Project; Technical Specification Group Core Network and Terminals; Policy and Charging Control over Gx reference point (Release 9)," 3GPP Standard; 3GPP TS 29.212, 3rd Generational Partnership Project (3GPP), Mobile Competence Centre; 650, Route Des Lucioles; F-06921 Sophia-Antipolis Cedex; France, No. V9.0.0, Sep. 1, 2009; 92 pages.

3GPP TS.23.203 v.11.3.0 Technical Specification—"3rd Generation Partnership Project; Technical Specification Group Services and System Aspects; Policy and Charging control architecture (Release 11)," Sep. 2011; 167 pages.

3GPP TS.23.401 v.10.5.0 Technical Specification—"3rd General Partnership Project; Technical Specification Group Services and System Aspects: General Packet Radio Service (GPRS) enhancements for Evolved Universal Terrestrial Radio Access Network (E-UTRAN) access (Release 10)," Sep. 2011, 284 pages.

3GPP TS 23.236 v.10.0.0 Technical Specification—"3rd General Partnership Project; Technical Specification Group Services and Systems Aspects; Intra-Domain Connection of Radio Access Network (RAN) Nodes to Multiple Cor Network (CN) Nodes (Release 10)," Mar. 2010, 39 pages.

Chowdhury, K. "Fast Handoff Support for HRPD," 3rd Generation Partnership Project 2, 3GPP2, Apr. 24, 2006.

Chowdhury, K. "Network-Based Layer 3 Connectivity and Mobility Management for IPv6," draft-chowdbury-netmip6-01.txt, Network Working Group Internet Draft, Sep. 8, 2006, 20 pages http://tools.ietf.org/html/draft-chowdbury-netmip6-01.

Chowdhury, K., "Network Based L3 Connectivity and Mobility Management for IPv4," draft-chowdbury-netmip4-001.tt, Feb. 25, 2006; 16 pages http://tools.ietf.org/html/draft-chowdbury-netmip4-00.

Cisco Systems, Inc., "Cisco Application-Oriented Networking," © 1992-2006; 10 pages http://www.cisco.com/en/US/prod/collateral/modules/ps6438/product_data_sheet0900aecd802c1f9c.html.

Cisco Systems, Inc., Configuring URL Routing (L5 Routing) on the CSS 11000 and 11500, © 1992-2006; Document ID: 25999; 5 pages http://www.cisco.com/en/US/products/hw/contnetw/ps792/products_configuration_example09186a00801cOdbc.shtml.

Devarapalli, V., et al., "Proxy Mobile IPv6 and Mobil IPv6 Interworking," draft-devarapalli-netlmm-pmipv6-mipv6-00.txt, NETLMM Working Group Internet Draft, Apr. 10, 2007; 9 pages. http://tools,ietf.org/html/draft-devarapalli-netlmm-pmipv6-mipv6-00.

Lior, A., et al., "Mobile IP Key Derivation using EAP," draft-lior-mipkeys-eap-00, Network Working Group, Feb. 25, 2006; 17 pages http://tools.ietf.org/html/draft-lior-mipkeys-eap-00.

Navali, J., et al., "IPv6 over Network based Mobile IPv4," draft-navali-ip6-over-netmip4-00.txt, Network Working Group, Feb. 25, 2006; 20 pages http://tools.ietf.org/html/draft-navali-ip6-over-netmip4-00.

User Agent Profile (UAProf) Specification, Wireless Application Group, Wireless Application Protocol Forum, Version 10, Nov. 1999, 76 pages.

EPO Oct. 1, 2013 Communication from European Application Serial No. 10779129.5.

"Stoke Mobile Data Offload Solution Brief," © 2009 Stoke, Inc.; Aug. 2009, 4 pages; [Retrieved and printed Nov. 14, 2013] stoke.com/GetFile.asp?f=a08fed265abc46434edf6763307c1078.

U.S. Appl. No. 14/260,387, filed Apr. 24, 2014, entitled "System and Method for Managing Out of Order Packets in a Network Environment," Inventor(s): Walter Dixon et al.

U.S. Appl. No. 14/257,098, filed Apr. 21, 2014, entitled "Accelerated Processing of Aggregate Data Flows in a Network Environment," Inventor(s): Imnaz Meher Jilani et al.

U.S. Appl. No. 14/257,131, filed Apr. 21, 2014, entitled "Selective Packet Sequence Acceleration in a Network Environment," Inventor(s): Bhagatram Janarthanan.

PRC Apr. 3, 2014 SIPO First Office Action from Chinese Application No. 201080051408.1.

PRC Dec. 12, 2014 SIPO Second Office Action from Chinese Application No. 201080051408.1.

\* cited by examiner

SYSTEM AND METHOD FOR EXCHANGING INFORMATION IN A MOBILE WIRELESS NETWORK ENVIRONMENT

TECHNICAL FIELD

This disclosure relates in general to the field of communications, and more particularly, to exchanging information in a mobile wireless network.

BACKGROUND

Networking architectures have grown increasingly complex in communications environments, particularly mobile wireless environments. Mobile data traffic has grown extensively in recent years; the types of data being transported through mobile wireless networks have also changed dramatically. Video, file-sharing, and other types of usages (more traditionally associated with wired networks) have been gradually displacing voice as the dominant traffic in mobile wireless networks. In addition, the augmentation of clients or end users wishing to communicate in a network environment has caused many networking configurations and systems to respond by adding elements to accommodate the increase in networking traffic. As the subscriber base of end users increases, proper routing and efficient management of communication sessions and data flows become even more critical. Hence, there is a significant challenge in coordinating which flows merit particular processing in order to minimize resources and expenses associated with optimally managing network traffic.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes communicating a message to a remote data plane element in order to request a data plane resource for hosting a session. The method also includes receiving a response at a network element acknowledging the message. Data plane traffic can be managed at the remote data plane based on enforcement rules. The enforcement rules are provisioned in a table element at the remote data plane element, and the table element reflects a portion of a master table element included in the network element.

In more specific implementations, the method can include communicating subsequent messages to the data plane element in order to update the session in response to a mid-session event, and to terminate the session in response to a termination event. A control plane element is configured to be used for session management and call setup support activities associated with the session. The remote data plane can maintain a specific subset of enforcement rules to be applied to the session, where at least one of enforcement rules relates to a wireless mobility feature for the session.

In specific scenarios, a flow can be mapped out of a tunnel against user-specific enforcement rules associated with the session. One or more data segments from the tunnel are used in order to map the flow to the user-specific enforcement rules. A control plane element can be configured to control which portion of the master table is to be provisioned in the remote data plane element.

Example Embodiments

Figure 1:
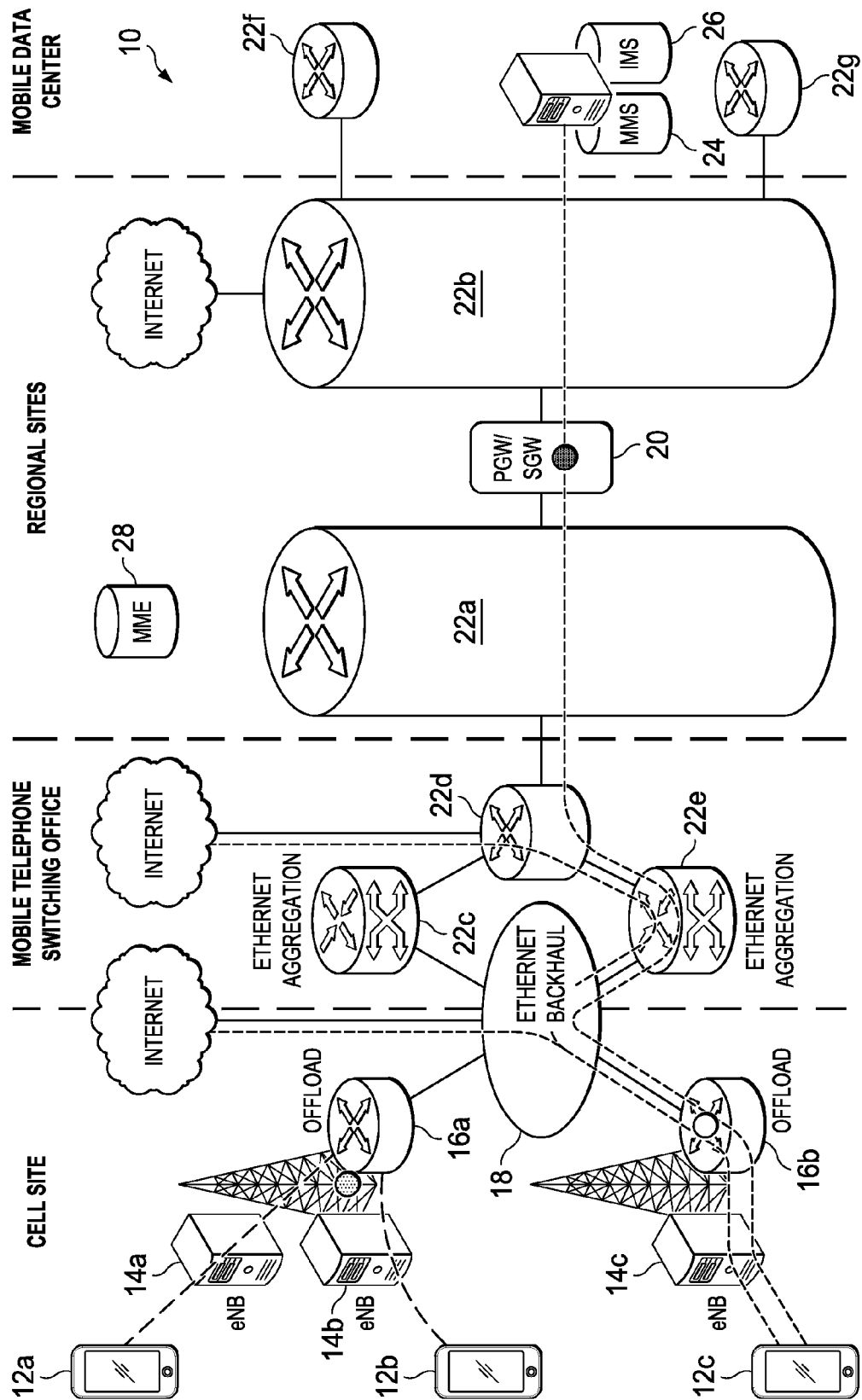
FIG. 1 is a simplified block diagram illustrating a communication system for exchanging information in a mobile wireless network environment according to one embodiment of the present disclosure.

Turning to FIG. 1, FIG. 1 is a simplified block diagram of an example embodiment of a communication system 10, which can be associated with a mobile wireless network. The example architecture of FIG. 1 includes multiple instances of user equipment (UE) 12a-c: each of which may connect wirelessly to a respective eNode B (eNB) 14a-c. Each eNB 14a-c may be connected to a network element 16a-b, which can be tasked with providing offload functionalities for the architecture. Network elements 16a-b are connected to an Ethernet backhaul 18. Communication system 10 can also include various network elements 22a-g, which can be used to exchange packets in a network environment. As illustrated, the architecture of communication system 10 can be logically broken into a cell site segment, a mobile telephone switching office (MTSO) segment, a regional sites segment, and a mobile data center (DC) segment.

A packet data network gateway (PGW)/serving gateway (PGW/SGW) 20 may be connected to Ethernet backhaul 18 and a data center through one or more intermediate network elements. The mobile data center may include a Multimedia Messaging Service (MMS) 24 and an Internet protocol (IP) Multimedia Subsystem (IMS) 26. A Mobility Management Entity (MME) 28 is also provided for facilitating user interaction, such as tracking user equipment and authenticating users. Other networks, including an instantiation of the Internet, may be connected to the mobile wireless network at several locations, including at various network elements and Ethernet backhaul 18.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include transmission control protocol/Internet protocol (TCP/IP) communications for the transmission or reception of packets in a network, and may also operate in conjunction with a user datagram protocol/IP (UDP/IP) or any other suitable protocol where appropriate and based on particular needs.

Communication system 10 may be tied to the 3rd Generation Partnership Project (3GPP) Evolved Packet System architecture, but alternatively this depicted architecture may be equally applicable to other environments. In general terms, 3GPP defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks is done via the evolved PDG (ePDG), which provides for IPsec security associations to the user equipment over the untrusted IP access network. The ePDG (in turn) supports mobility, policy, and AAA interfaces to the EPC, similar to the trusted IP access networks.

Note that user equipment 12a-c can be associated with clients, customers, or end users wishing to initiate a communication in system 10 via some network. In one particular example, user equipment 12a-c reflects individuals capable of generating wireless network traffic. The term 'endpoint' is inclusive of devices used to initiate a communication, such as a computer, a personal digital assistant (PDA), a laptop or electronic notebook, a cellular telephone, an iPhone, a Blackberry, a smartphone, a tablet, an iPad, an IP phone, or any other device, component, element, equipment, or object capable of initiating voice, audio, video, media, or data exchanges within communication system 10. User equipment 12a-c may also be inclusive of a suitable interface to the human user, such as a microphone, a display, or a keyboard or other terminal equipment. User equipment 12a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

For purposes of illustrating certain example techniques of communication system 10, it is important to understand the communications that may be traversing the network. The following foundational information may be viewed as a basis from which the present disclosure may be properly explained. IP networks may provide users with connectivity to networked resources such as corporate servers, extranet partners, multimedia content, the Internet, and any other application envisioned within IP networks. While these networks generally function to carry data plane (user-generated) packets, they may also implicate control plane and management plane packets. Unlike legacy network technologies (e.g., Integrated Service Digital Network (ISDN), Frame Relay, and Asynchronous Transfer Mode (ATM)) that define separate data and control channels, IP networks carry packets within a single pipe. Thus, IP network elements such as routers and switches should generally be able to distinguish between data plane, control plane, and management plane packets, where this enables each packet to be suitably processed. In general, the data plane (also known as the forwarding plane or the user plane) provides the ability to forward data packets; the control plane provides the ability to route data correctly; the management plane provides the ability to manage network elements.

The vast majority of packets handled by a router travel through the router via the data plane. Data plane packets typically consist of end-station, user-generated packets that are forwarded by network devices to other end-station devices. Data plane packets may have a transit destination IP address, and they can be handled by normal, destination IP address-based forwarding processes. Service plane packets are a special case of data plane packets. Service plane packets are also user-generated packets that may be forwarded by network elements to other end-station devices, but they may require high-touch handling by a network element (above and beyond normal, destination IP address-based forwarding) to properly forward the packet. Examples of high-touch handling include such functions as Generic Routing Encapsulation (GRE) encapsulation, quality of service (QoS), Multi-protocol Label Switching (MPLS), virtual private networks (VPNs), and secure socket layer (SSL)/IPsec encryption/decryption. In a mobile network, the data plane may be responsible for packet processing at a session/flow level, multiple flows/session per active user, access control list (ACL)/traffic flow template (TFT) filters per user/flow, tunneling, rate limiting, subscriber scalability, security, and Layer 7 (L7) inspection. These activities are typically intensive in terms of memory and packet processing.

Control plane packets commonly include packets that are generated by a network element (e.g., a router or a switch), as well as packets received by the network that may be used for the creation and operation of the network itself. Control plane packets may have a receive destination IP address. Protocols that "glue" a network together, such as address resolution protocol (ARP), border gateway protocol (BGP), and open shortest path first (OSPF), often use control plane packets. In a mobile network, the control plane may be responsible for session management, call setup support requirements, interfacing with external servers (e.g., querying for per-user policy and control information), managing high availability for a gateway, and configuring and managing the data plane. Packet overloads on a router's control plane can inhibit the routing processes and, as a result, degrade network service levels and user productivity, as well as deny specific users or groups of users' service entirely.

Management plane packets also typically include packets that are generated or received by a network element. This may also include packets generated or received by a management station, which are used to manage a network. Management plane packets may also have a receive destination IP address. Examples of protocols that manage a device and/or a network, which may use management plane packets, include Telnet, Secure Shell (SSH), Trivial File Transfer Protocol (TFTP), Simple Network Management Protocol (SNMP), file transfer protocol (FTP), and Network Time Protocol (NTP).

Typically, mobile wireless service providers have selected and deployed gateway products that combine mobile wireless specific control plane functionality (and protocol usage) with data plane functions. The data plane functions may be used for classification, tunneling, feature enforcement, and accounting. Such a combined functionality may be viable for subscriber traffic models exhibiting low-data throughput and, further, having an active device population that supports data services in the few million range. However, as the number of subscribers and data throughput increases, this strategy can limit the ability of service providers to scale their systems accordingly. Service providers may also wish to focus on a smaller number of deployed platforms for both wireless and wireline networks in order to reduce the cost of day-to-day network operations.

In accordance with the teachings of the present disclosure, the architecture discussed herein offers a protocol for abstracting mobile wireless specific protocol usage and feature application from the data plane function. This can be used to provide content included on those protocol transactions or mobile wireless specific control-type functions. In general terms, the architecture can be configured to allow for the decomposition of the functionality and the characterization of the data plane to comport with familiar routing contexts.

More specifically, architecture of the present disclosure offers a protocol definition that abstracts the mobile wireless specific aspects from the data plane. This would be applicable to subscriber packets, as well as the mobile wireless specific usage of existing protocols. In specific implementations, the protocol can employ H.248 message constructs and, further, adopt the termination and context concepts of H.248. The architecture can add functionalities into those message constructs and, further, provide a single protocol for effectively processing network traffic.

Communication system 10 can offer mobility, policy control, authentication, authorization, and accounting (AAA) functions, and charging activities for various network elements. For example, interfaces can be used to exchange point of attachment, location, and access data for one or more end users. Resource, accounting, location, access network information, network address translation (NAT) control, etc. can be exchanged using a remote authentication dial in user service (RADIUS) protocol, a Diameter protocol, a service gateway interface (SGI), terminal access controller access-control system (TACACS), TACACS+, etc.

The architecture of communication system 10 could support a general-purpose router that is hosting the mobile wireless data plane function for a subscriber: without the need for mobile wireless specific knowledge at that router, or expertise for the operations staff tasked with managing that part of the network. The complexities of control plane interoperability, day-to-day management, policy, and billing system interaction can be efficiently concentrated in locations where specialist knowledge and suitable network infrastructure is available.

Semantically, three distinct functions can be used to achieve such an abstraction. First, there can be a discovery of nodes capable of supporting the specialized control plane functions, along with the discovery of other nodes capable of supporting the data plane functionality. Second, there can be a system-specific configuration to support additional internal configuration for supporting the separation. This could include available protocol proxies and application-specific configurations (e.g., access control lists (ACLs), pre-defined QoS and charging policies, pre-loaded deep packet inspection (DPI) policies, per-realm definitions, etc.). Third, there can be activities associated with session create, update, and delete being provided together with event notification. Semantically, the control plane can be divided into several segments in order to fully utilize available resources (e.g., within the chassis).

In operation, by using the defined protocol, the specialized control plane function would be responsible for parsing of the session create message, for interactions with the external policy server, and for abstracting elements pertinent to the data plane. These can be formulated in terms of parameters already familiar in the router technology environment (e.g., maximum bit rate, guaranteed bit rate, potential marking actions for conforming and exceeding traffic). These parameters can be sent to (and applied by) a network element (e.g., a router) that is configured to host the data plane for the subscriber.

Hence, the architecture of FIG. 1 is effectively reducing and eliminating the constraints of previous architectures by intelligently generalizing the data plane such that general-purpose routers can be leveraged. This can occur while concentrating specialized needs in a small number of more centralized control plane functions. Moreover, this data plane generalization further allows more user data to be offloaded at network elements much closer to the network edge (e.g., network element 16a). In one sense, the functions detailed herein can be distributed across the network in order to alleviate burdensome processing that would otherwise occur at a single network element. This would directly reduce the downstream processing requirements (e.g., at PGW/SGW 20). The general-purpose processor could be a more robust processor, or have different performance metrics, or be more adept at processing certain types of information (e.g., video or voice), or be preferred (for other optimization reasons) over standard processors that exist in the network.

In operation, a message can be communicated to a remote data plane element (e.g., provisioned as software, provisioned as hardware, provisioned within a network element, provisioned at the edge of the network, etc.) in order to request a data plane resource (e.g., memory space, a processor allocation, bandwidth, etc.) for hosting a communication session. A response can then be received from the initiating network element acknowledging the message. The data plane traffic can be managed at the remote data plane based on enforcement rules, which can be reflective of any relevant policy, treatment, billing, protocol, etc. that may be applicable to this particular flow, to this particular user, to this particular tunnel, to this particular service provider, etc. The enforcement rules can be provisioned in a table element at the remote data plane element, where the table element reflects a portion of a master table element included in one of the network elements of a network. [Details associated with the table elements are provided below.]

Figure 2:
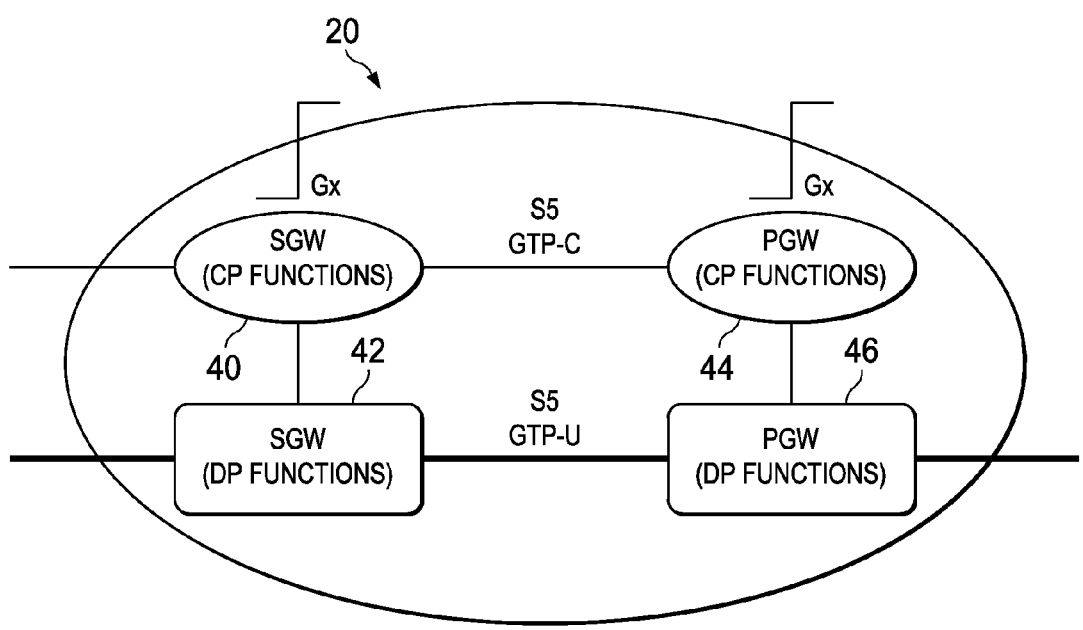
FIG. 2 is a simplified block diagram illustrating logical components of a gateway provided in the mobile wireless network environment according to one example of the present disclosure.

Turning to FIG. 2, FIG. 2 is a detailed block diagram illustrating potential logical components of PGW/SGW 20. As shown, PGW/SGW 20 may be decomposed into SGW control plane (CP) functions 40, SGW data plane (DP) functions 42, PGW CP functions 44, and PGW DP functions 46. In general, there is significant functionality in the control plane with high transaction rates and memory requirements that would benefit from high-performance central processing units (CPUs). The data plane should be subscriber-aware and, with increasing radio access network (RAN) bandwidth, would benefit from high-performance packet processing. The data plane can be decomposed into four functions: classification, tunneling, enforcement, and accounting.

Figure 3:
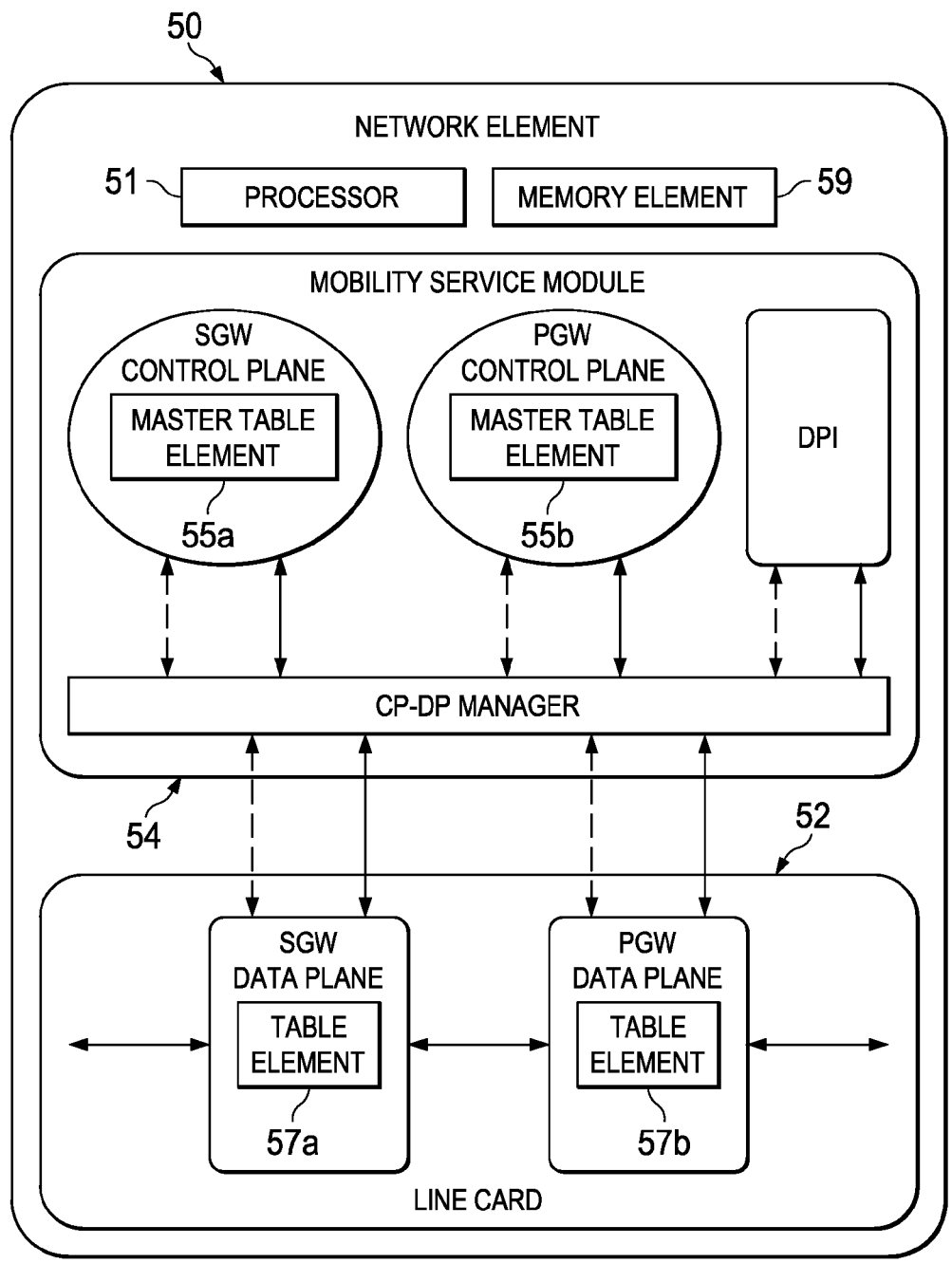
FIG. 3 is a simplified block diagram illustrating an arrangement of a gateway provided in the mobile wireless network environment according to one example of the present disclosure.

FIG. 3 is a simplified block diagram illustrating an example embodiment of a network element 50 (which could be reflective of a PGW/SGW device, a router in the network, a gateway in the network, etc.). In this example, network element 50 is implemented in a single chassis, which may include a line card 52 and a mobility service module 54. In network element 50, data plane functions may be encoded in line card 52, while control plane functions are embedded in mobility service module 54. Mobility service module 54 also includes a DPI function and a CP-DP manager in this particular implementation. In certain implementations, an opaque packet transfer can occur (or any other mechanism) to divert specific flows from the data plane to a DPI capable network element, where the flows would then be sent back. Furthermore, there can be additional resources in the chassis with the line card (e.g., a service module) that can provide support for computationally intensive activities (e.g., L-7 classification in the chassis). These same computationally intensive activities might be supported via the opaque packet transfer at some point closer to the data center.

Figure 4:
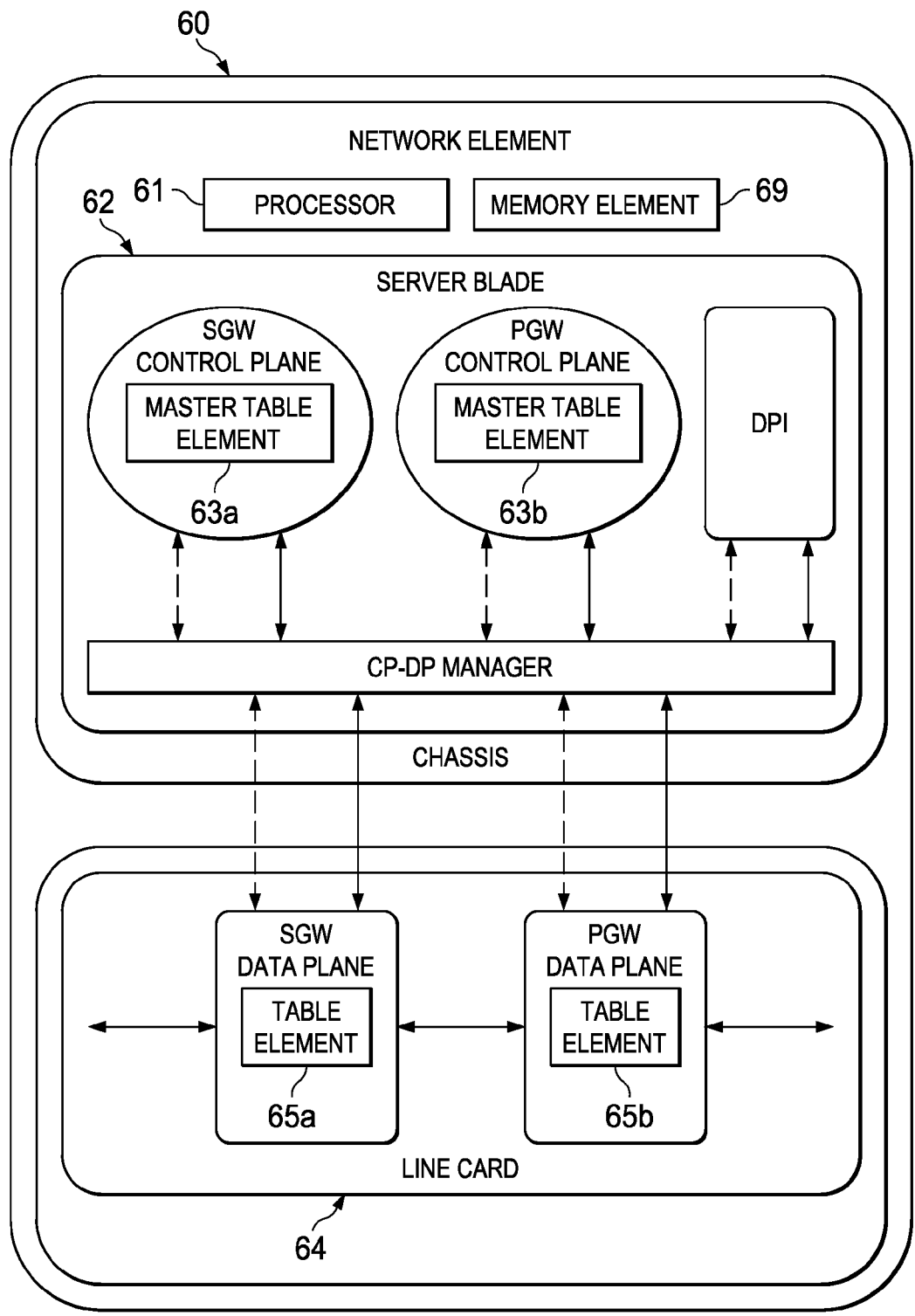
FIG. 4 is a simplified block diagram illustrating a gateway in the mobile wireless network environment according to one example of the present disclosure.

FIGS. 3 and 4 are somewhat related and, therefore, are discussed together. Note that the equipment of FIGS. 3 and 4 may be incorporated at any suitable location of communication system 10. For example, the equipment of FIG. 3 and/or FIG. 4 could be deployed in the regional sites, the mobile telephone switching office, and/or the cell site (as being depicted in FIG. 1). More specifically, FIG. 4 is a simplified block diagram of a network element 60 (which could similarly be reflective of a PGW/SGW device, a router, gateway, etc.). Network element 60 is representative of a distributed implementation, where control plane functions may be embedded in a server blade 62 of the network element. Data plane functions can be encoded on a separate network element in a different chassis (e.g., in a line card 64). Line card 64 may be co-located on the same local area network, or geographically separated on a wide area network.

Note that the internal structure of network elements 50 and 60 may be similar in certain implementations of the present disclosure. For example, each network element 50 and 60 may include appropriate CP-DP managers, DPI elements, SGW DP and PGW DP instances, etc. In one particular configuration, network element 50 includes a processor 51, a memory element 59, and a set of master table elements 55a-b, where a portion (or a relevant slice) of master table elements 55a-b may be replicated in a set of table elements 57a-b. Similarly, network element 60 may include a processor 61, a memory element 69, and a set of master table elements 63a-b, where a portion (or a relevant slice) of master table elements 63a-b may be replicated in a set of table elements 65a-b.

In operation, the remote data plane is somewhat ignorant of the actual users and the actual (complete) policy sets that may be prevalent in the network. Instead, the remote data plane has a specific subset of enforcement rules to be applied. A given network element is configured to map a flow (out of a tunnel) against user-specific enforcement rules (inclusive of treatment rules). The mapping of the packets (out of the tunnel) to these user-specific rules (without having user data present or co-located at the network element) stands in contrast to existing architectures, which maintain a complete universe of all known policies and all known users. This creates significant, almost oppressive, levels of processing overhead. In one particular instance, an enforcement rule to be applied could be associated with a wireless mobility function.

The configurations of FIGS. 3-4 have the intelligence to use artifacts (i.e., any type of relevant data segments) from the tunnel in the mapping activity. The mapping can be provisioned in any suitable table (i.e., such as those illustrated in FIGS. 3-4). In practical terms, though, the actual network element may be incapable of effectively maintaining the entirety of the master tables. In one particular instance, table elements 57a-b and table elements 65a-b include a portion of their respective master table elements, where that portion includes information associated with flows that are current for this particular network element, at this particular time, and involving a particular user.

To overcome the processing and storage challenges, the protocol of the present disclosure includes the incorporation of a smaller version of the master table element (e.g., replicated as a skinny table) at a lower level (e.g., at a line card level) of the network element. The skinny table essentially includes relevant data at this current time with regard to user-specific policies. That data could be suitably stored, cached, accessed, or otherwise provided by table elements 57a-b and table elements 65a-b. In one particular example, the control plane elements (e.g., SGW CP, PGW CP) dictate or otherwise control the portion of the master tables to be provisioned within the data plane elements. Note that the control plane understands which slices of rules (a minimal amount) are needed by the DP for making intelligent routing/policy decisions. Hence, it can be left up to the CP element to manage the appropriate rules such they are provisioned at the proper time to allow the DP element to execute its functions. In one sense, the DP element finds these rules as if it had the universe of all rules; however, the CP element is actually providing just-in-time information to the DP element for executing the appropriate function (e.g., a wireless mobility function). In one generic sense, the CP element has to systematically stay ahead of the DP such that the DP can timely perform its functions.

In one particular instance, network elements 50 and 60 are configured to exchange data in a network environment such that the mobile wireless functionality discussed herein can be achieved. As used herein in this Specification, the term 'network element' is meant to encompass various types of routers, switches, gateways, bridges, loadbalancers, firewalls, servers, inline service nodes, proxies, processors, modules, or any other suitable device, component, element, or object operable to exchange information in a network environment. The network element may include appropriate processors, memory elements, hardware and/or software to support (or otherwise execute) the activities associated with using a processor for mobile wireless functionalities in the data plane, as outlined herein. Moreover, the network element may include any suitable components, modules, interfaces, or objects that facilitate the operations thereof. This may be inclusive of appropriate algorithms and communication protocols that allow for the effective exchange of data or information.

In a specific implementation, network elements 50 and 60 include software to achieve (or to foster) the mobile wireless operations, as outlined herein in this document. For example, this could include mobility service module 54 and server blade 62, which can be configured to execute many of the activities discussed herein with respect to mobile service functions. Furthermore, in one example, network elements 50 and 60 can have an internal structure (e.g., have a processor, a memory element, etc.) to facilitate some of the operations described herein. In other embodiments, all of these mobile wireless functions may be provided externally to this element, distributed in the network, or included in some other network element to achieve this intended functionality. Alternatively, any other network element can include this software (or reciprocating software) that can coordinate with network elements 50 and 60 in order to achieve the operations, as outlined herein.

Note that in certain example implementations, the mobile wireless functions outlined herein may be implemented by logic encoded in one or more tangible media (e.g., embedded logic provided in an application specific integrated circuit

[ASIC], digital signal processor [DSP] instructions, software [potentially inclusive of object code and source code] to be executed by a processor, or other similar machine, etc.). In some of these instances, a memory element [as shown in FIGS. 3-4] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIGS. 3-4] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Hence, any of the devices illustrated in the preceding FIGURES (e.g., the network elements of FIG. 1) may include a processor that can execute software or an algorithm to perform the mobile wireless activities, as discussed in this Specification. Furthermore, network elements 50 and 60 can include memory elements for storing information to be used in achieving the intelligent mobile wireless operations, as outlined herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.' Each network element 50 and 60 of FIGS. 3-4 can also include suitable interfaces for receiving, transmitting, and/or otherwise communicating data or information in a network environment.

Figure 5:
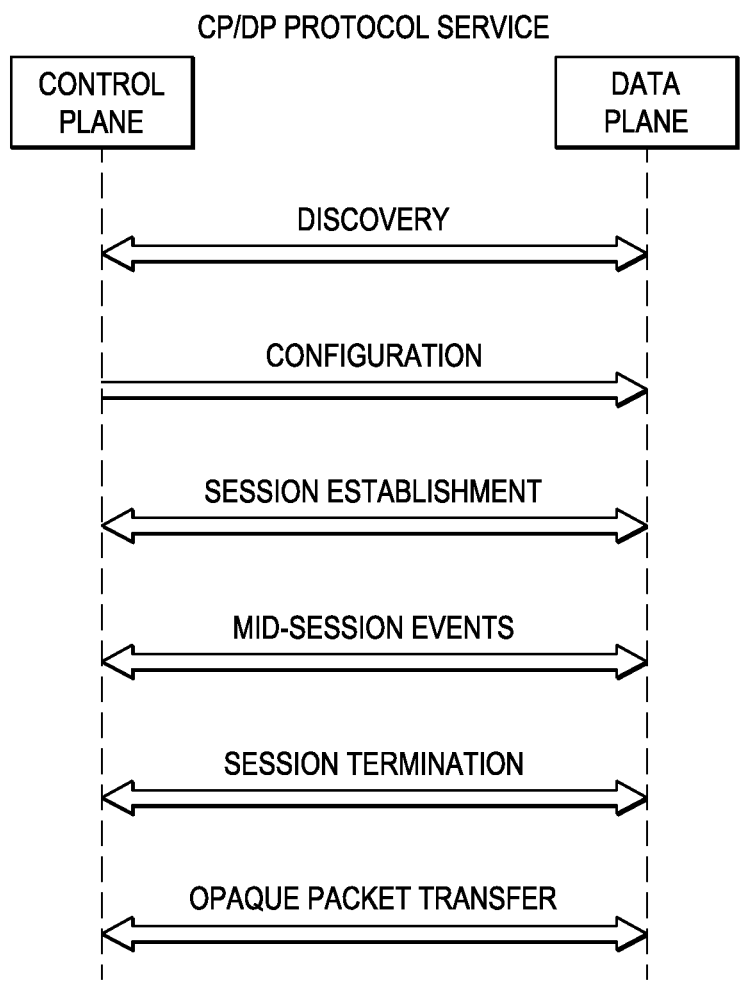
FIG. 5 is a simplified flow diagram illustrating potential operations associated with a protocol service according to one example of the present disclosure.

Referring to FIG. 5, FIG. 5 is simplified flow diagram illustrating example activities associated with communication system 10. More specifically, the architecture is being depicted as abstracting certain mobile wireless specific aspects from the data plane. This would include both features that apply to subscriber packets, as well as the mobile wireless specific usage of existing protocols. In one embodiment of wireless network 10, the protocol stack may be implemented with Ethernet and UDP at the transport layer. However, in an alternative embodiment, a Stream Control Transmission Protocol (SCTP) may be used at the transport layer, particularly in embodiments in which the control plane would be geographically separated from the data plane.

Above the transport layer, a robust inter-process communication mechanism can be employed (e.g., Transparent Inter-Process Communication (TIPC)), or any other appropriate mechanism. TIPC may be particularly advantageous because it is lightweight and, further, it provides location transparency of network services and a simplified addressing scheme (along with scalability and reliability). At the application layer, the protocol may use H.248 message constructs and adopt the termination and context concepts of H.248. However, the protocol may also add functionality within those message constructs and abstract specific protocol usage. Several distinct functions may be implemented for such an abstraction, which may be generally classified into six phases, as illustrated in FIG. 5: 1) discovery; 2) configuration; 3) session establishment; 4) mid-session events; 5) session termination; and 6) opaque packet transfer.

Discovery is the process by which each protocol termination point within the physical data plane and control plane may discover available resources in the network. This would allow the control plane and data plane to establish and to maintain connectivity. Many aspects of the mobile data plane functionality may be preconfigured. These can cover two areas: functionality related to the mobility application itself and system configuration for the independent elements to function together. Part of this configuration may be manually preconfigured; the remainder may be automated at the control plane and occur as a result of configuration actions at the control plane. The application-specific configuration may support aspects such as interface definitions (e.g., physical interfaces, VLANs, addresses assigned to those interfaces), tunnel terminations (e.g., GTPv1, GTPv0, GRE, L2TP, IPinIP), per-access point name (APN) configurations, and policy for DPI, charging, policy and control. The system configuration may support aspects such as address assignment for service resources, pre-population for line card (LC) service switching to specific mobility service resources, configuration proxy, SNMP management proxy, Dynamic Host Configuration Protocol (DHCP) Server proxy, Layer 2 tunneling protocol (L2TP) control point, Gy proxy, Gz/Ga proxy, Syslog proxy, and service resource load reporting proxy, etc.

Figure 6:
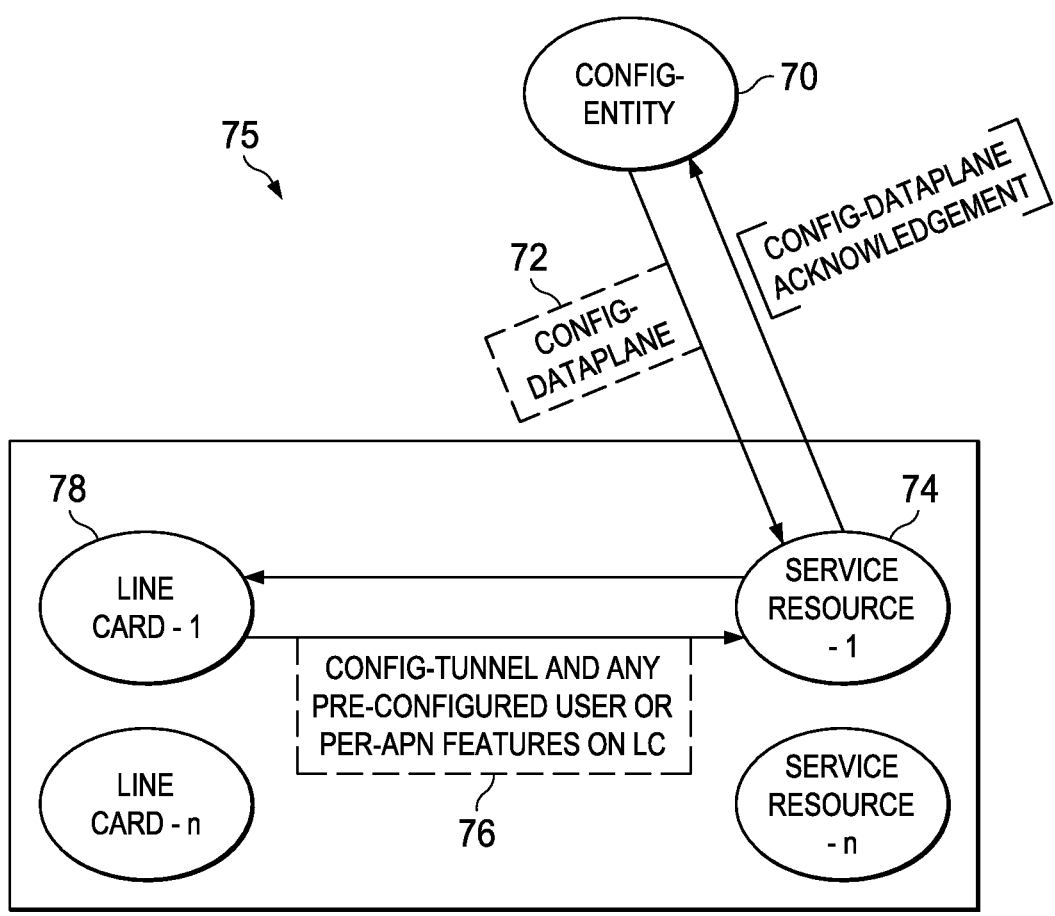
FIG. 6 is a simplified flow diagram illustrating potential operations associated with network elements in the mobile wireless network environment according to one example of the present disclosure.

Referring to FIG. 6, FIG. 6 is a simplified flow diagram 75 of a configuration that may be used in conjunction with communication system 10. In this particular scenario, a configuration entity 70 may send a Config-Dataplane message 72 to a service resource blade 74 selected by configuration entity 70. Service resource blade 74 may exchange configuration messages 76 with a line card 78. Once the configuration is complete, service resource blade 74 may return a Config-Dataplane-Acknowledgement message 76, in which success or failure of the configuration attempt may be indicated.

During session establishment, the subscriber-specific treatment for upstream and downstream traffic may be passed to a data plane resource that can host a subscriber on a PGW/SGW. This corresponds to the point when the primary session is established, regardless of whether that session is subscriber-initiated or network-initiated. The per-subscriber information to be transferred from the control plane may be a combination of information derived from local configuration at the control plane, control plane resource management for loadbalancing, GPRS Tunneling Protocol (GTP) control plane messaging, exchanges with external servers (DHCP, Radius, Policy, and Online Charging), etc. This data may be sent in a Session-Create message, for example. In one embodiment of communication system 10, a specialized control plane function may parse the Session-Create message, interact with the external policy server, and then abstract elements pertinent to the data plane. These elements may be formulated in terms of parameters already familiar to general routers, such as maximum bit rate, guaranteed bit rate, potential marking actions for conforming and exceeding traffic. These parameters may be sent to a router that hosts the data plane for the subscriber, where the parameters would be properly applied. The data plane response, which may be provided in a Session-Create-Acknowledgement message, generally contains a Service Resource ID, a Line Card Resource ID, Type-Length-Value (TLV)/Attribute-Value Pair (AVP) for transparently carrying a preformatted charging record from the data plane to the control plane (i.e. records created by the DPI function that should be transferred in a protocol by the control plane to an external server, for example), etc.

Mid-session events generally include any further events that occur after a primary session context has been established for a subscriber (e.g., other than primary session context termination). For example, these types of events can be triggered by handover, activation of a secondary context Packet Data Protocol (PDP), additional dedicated Evolved Packet System (EPS) bearers, termination of a secondary context (PDP), release of one or more dedicated EPS bearers, charging event triggers (e.g., volume or time-of-day), policy-originated triggers (e.g., usage monitoring control), legal intercept, mid-session traffic redirection, QoS parameter updates, service data flow identification, establishment, cessation, change of Radio Access Type (RAT), roaming, and others. The message sent from the control plane, such as a Session-Update message, may contain the same parameters as sent on session establishment (in addition to an indication of the event that resulted in the mid-session update). The message returned by the data plane, such as a Session-Update-Acknowledgement, may contain counters if the event charging is triggered. The data plane can also originate an update message when an event occurs (as provisioned on initial session establishment).

Session termination can include termination of the primary session context. At session termination, a subscriber is no longer assigned to a data plane physical entity or any associated service resources. This is the default EPS bearer for LTE (primary PDP context for the gateway GPRS support node (GGSN)). Session termination can be triggered by the user equipment, or the network. Network-initiated termination can be the result of operator actions or Policy Charging and Rules Function (PCRF) initiation, for example. The control plane may send a Session-Terminate message to end the last context for a subscriber. The data plane may respond with a Session-Terminate-Acknowledgement message. The Session-Termination message may contain counters reflecting the end-of-session status.

An example of mobile wireless specific abstraction would be the case of per-subscriber QoS policies. Traditionally, on receipt of a session create request a mobile wireless gateway would send a Diameter message to a policy server. This message may contain specific attribute-value pairs (AVPs) defined in 3GPP standards, as well as any vendor-proprietary AVPs specific to the application. The policy server would return policies in rules containing AVPs: again defined in a way specific to the mobile wireless application. These would be parsed and applied directly to the data plane.

Similarly, for accounting, various schemes can be applied per-subscriber and returned via mobile wireless policy interactions. In pragmatic terms, the data plane is interested in maintaining packet and byte counts, together with a trigger (either volume or time), where the counts would be reported. The packaging of counts (to suit the billing scheme) applied for the subscriber is not visible to the router hosting the data plane function. In addition to per-subscriber accounting, messages providing for special per-subscriber treatment, such as in-chassis L7 DPI or off-board DPI processing may be signaled from the CP to the DP.

Figure 7:
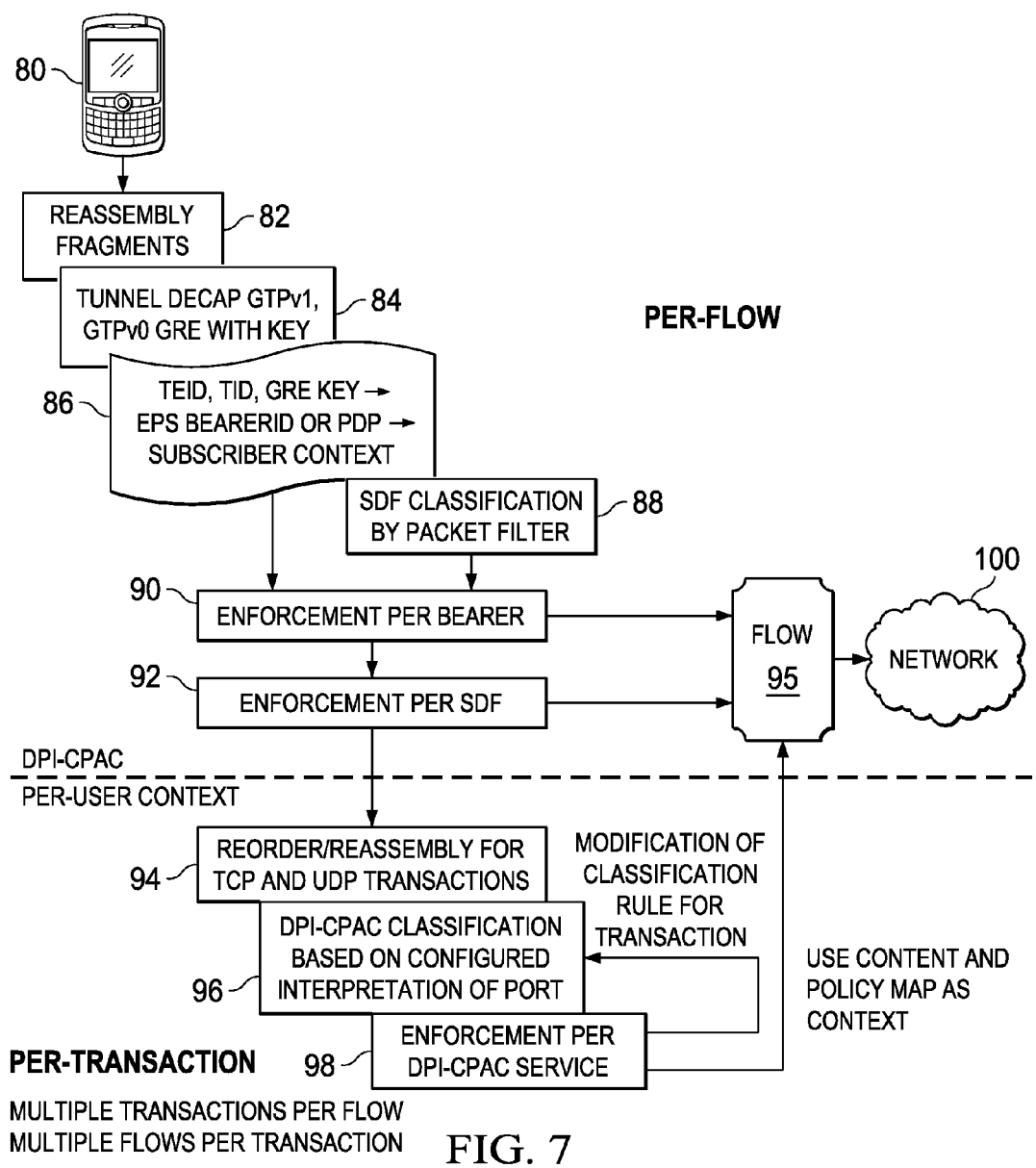
FIG. 7 is a simplified flow diagram illustrating potential operations associated with processing packets originating from a mobile device in the mobile wireless network according to an example of the present disclosure.

FIG. 7 is a simplified block diagram illustrating a potential flow associated with an embodiment of a mobile wireless functionality according to the present disclosure. More particularly, FIG. 7 is representative of a potential sequence for processing packets originating from a mobile device 80 (i.e., reflective of a type of endpoint). Note that the application of per-flow enforcement features and per-transaction enforcement features may be dependent on configuration and policy. The data plane generally would not prevent both feature sets being applied.

Upstream packets from mobile device 80 can be received at the gateway (e.g., encapsulated within a tunnel). These tunneled packets may be fragmented prior to arrival at the gateway, and may be reassembled at 82, as depicted. Tunneled packet reassembly should cater for both in-order and out-of-order receipt of fragments. The feature context for a packet can be determined once the tunnel header has been received. Packets may be decapsulated at 84, as shown in FIG. 7.

Tunnel types may include GTPv1, GRE with key, GTPv0, etc. Independent of the tunnel type, the field of interest is that field, which is used to determine the correct data plane feature context to apply to the packet. This could involve a tunnel endpoint identifier (TEID) for GTPv1, a GRE key for GRE with a key mechanism, a tunnel identifier (TID) for GTPv0), etc. In the case of GTPv1 and GRE with key, the receiving gateway may allocate the TEID or GRE key, respectively, to be used by the communicating gateway. For GTPv0, the TID may be allocated by the sending gateway. Any of these data segments (which can be gleaned from the tunnel) can be used in order to map a given flow to particular rules associated with network traffic.

The TEID, GRE key, or TID, as appropriate for the tunnel type, can identify a specific EPS bearer or PDP context associated with the subscriber packet. The field can be unique for a given tunnel header source and destination IP pair. This may be used to determine the feature context for the packet: together with an identification of the EPS bearer or PDP context for that packet, as shown at 86. Further classification of the packet may depend on the feature context. Service Data Flow (SDF) may be further classified at 88, based on packet filters in per-user rules, which may be received from a policy server and, further, be maintained in the feature context. Per-flow classification and per-transaction classification may be applied based on policy and local configuration.

The set of features to be enforced for a given packet may be contained in the feature context. Three categories of such features may include: (1) features identified following classification to a bearer; (2) features identified as a result of further classification to a Service Data Flow; and (3) features identified as a result of further transaction-based classification. The feature context may be constructed from multiple sources such as through local configuration, per-gateway, and per-user: either manually configured or pre-loaded from a policy server. Another source could relate to per-user policy rules, which are sent from a policy server on session establishment or during an update. In other implementations, the source could include a derived per-transaction context for L7 Heuristic and Transaction classification.

At 90, features may be enforced per-bearer, or alternatively at 92, features may be enforced per a flow 95. Packets may subsequently be reordered and reassembled (as needed) for TCP and UDP transactions at 94. The DPI-CPAC classification (as shown at 96) may be based on a configured interpretation of the port. At 98, additional enforcement per DPI-CPAC may be applied. Packets may then be sent over network 100 to its intended destination.

Figure 8:
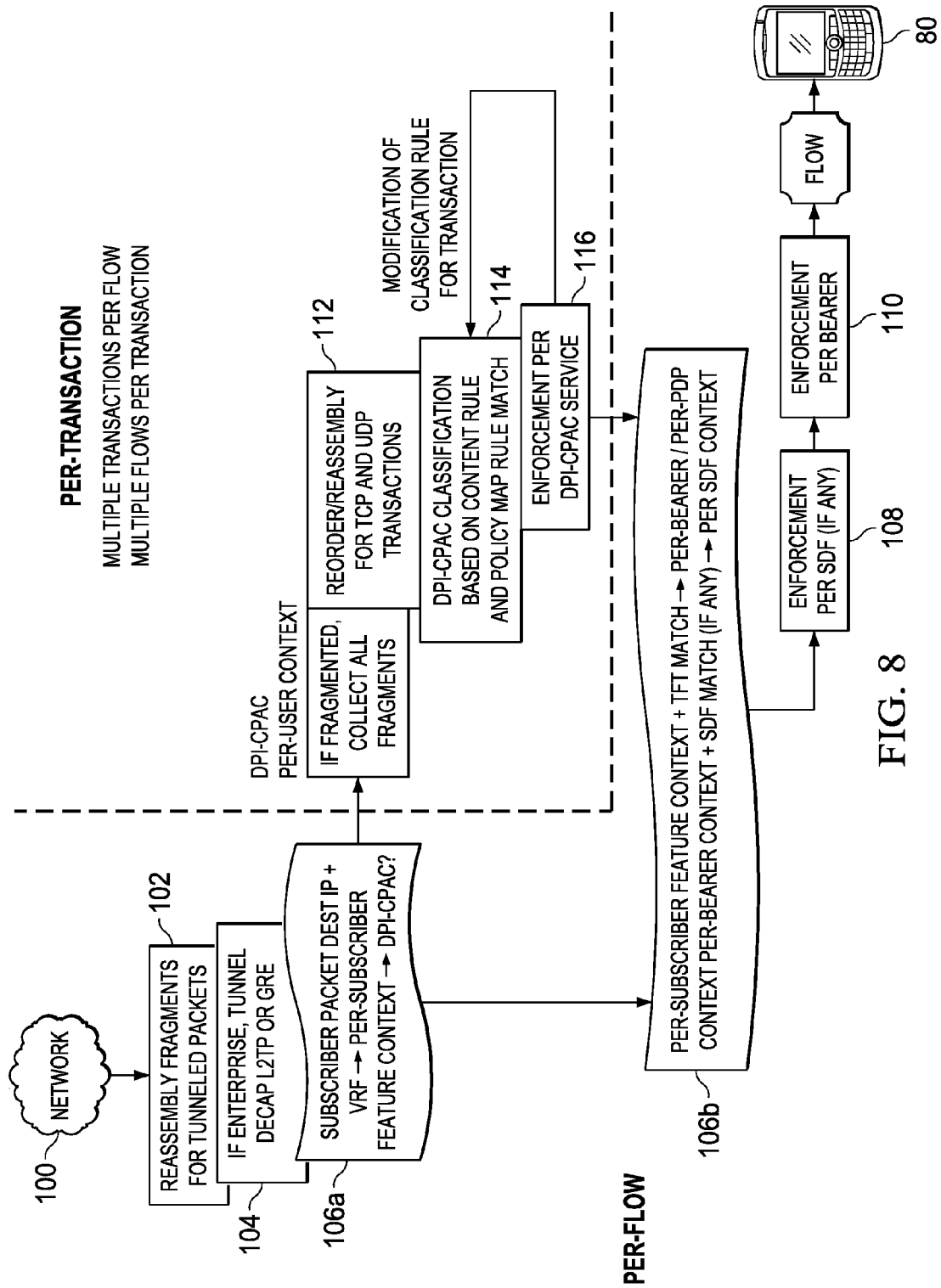
FIG. 8 is a simplified flow diagram illustrating potential operations associated with processing packets originating in the mobile wireless network according to one example of the present disclosure.

FIG. 8 is a simplified block diagram illustrating another potential flow associated with an embodiment of a mobile wireless functionality according to the present disclosure. More particularly, FIG. 8 is representative of a potential sequence for processing packets originating from network 100. At 102, fragment reassembly may be necessary to correctly decapsulate a tunneled packet. Tunnel encapsulation may be supported at 104 for enterprise tunneling. Classification of the user packet at 106a and 106b may be provided at three levels: (1) per-transaction, (2) per-flow, and (3) per-bearer/PDP context. Classification for downstream traffic may first identify the subscriber context together with the information necessary to perform per-bearer classification. Additionally, an evaluation can be made as to whether per-transaction or per-flow classification is required in addition to the per-bearer classification. Then, if indicated by context, a per-transaction or per-flow classification may be applied together with the associated features. This is followed by application of appropriate per-bearer features.

At 108, features may be enforced per-flow; at 110, features may be enforced per-bearer. Packets may be reordered and reassembled as needed for TCP and UDP transactions at 112. DPI-CPAC classification at 114 may be based on a content rule and policy map rule match. At 116, additional enforcement per DPI-CPAC may be applied. Packets may then be sent to mobile device 80. Opaque packet transfer may be needed to handle packets during certain operations, including mobile/DHCP server interactions for address assignment, L2TP tunnel control signaling, diversion of GTP signaling messaging, and legal intercept.

A mobile device may be permitted to request dynamic address assignment for a session by using DHCP procedures. DHCP message interchange may be transferred between the mobile device and the gateway as user plane traffic within a GTP tunnel for the appropriate EPS bearer/PDP context. The DHCP server interface may be hosted in the control plane. For the mobile-to-DHCP server direction, the data plane may intercept DHCP packets from the mobile device. These DHCP packets can be destined for the IP address of the control plane, acting as a DHCP proxy for the mobile device. Note that whether the control plane requests an address from a DHCP server function integral with the control plane, or from an external DHCP address server, need not be visible to the mobile device.

Gateway-to-enterprise tunnel control signaling exchanges are generally necessary to establish an L2TP tunnel between the gateway acting as an L2TP access concentrator (LAC) and the enterprise functioning as a L2TP network server (LNS). The gateway address for the control messaging is the same as that being used for the L2TP tunnel itself. For the gateway-to-enterprise direction, the tunnel establishment messages may be originated from the control plane. The source UDP port of the tunnel establishment message may be populated to uniquely identify the control plane. For the enterprise-to-gateway direction, the L2TP signaling messages may be received at the data plane. The destination UDP port of the signaling message is that from the corresponding received signaling message. Based on this port, the received message may be sent from the data plane to the control plane using opaque transfer in certain implementations of the present disclosure.

For GTPv0 and GTPv1, the IP address for control plane signaling is generally the same as that for the GTP tunnel termination. For GTPv2, the address may be different, or it could be the same. Independent of the version, GTP control plane messages received at the gateway may be transferred to the control plane using an opaque transfer operation. For GTPv2 and v1, the destination UDP port for control plane messaging may be used to identify those messages, as the port is different from that defined for the data plane GTP tunnel. For GTPv0, the same destination port may be used for both control and data plane packets and, thus, GTPv0 data packets may be identified by a GTP message type of 255. For legal intercept, packets corresponding to a mobile device may be duplicated and sent to a remote device. The format for encapsulating packets can be 3GPP-specific, or provided in any other suitable format. In order to remove certain processing burdens from the data plane, duplicated packets may be sent to the control plane for transfer to the remote device. These packets may be transferred using the opaque transfer operation.

Note that there are other alternative arrangements of communication system 10, which can be similarly deployed in order to achieve the teachings of the present disclosure. For example, in order to fully utilize the general-purpose routers discussed herein (for the data plane function of a mobile wireless gateway), the interfaces specific to mobile wireless can be offloaded to a protocol proxy function. The protocol proxy can be configured to implement the mobile wireless specific usage of protocol, formatting of information elements, transmission mechanisms of wireless-standards specific interfaces, etc. This would not necessarily be extended to the content that is being transferred in those protocols.

A protocol supporting the interaction between the generic data plane and the mobile wireless specific control plane can incorporate information identifying the protocol proxy to be used for a given subscriber session, for each of the mobile wireless specific interfaces. Additionally, the protocol proxy could be identified by direct address (e.g., the IP address plus a suitable identifier), or by name to indicate one of a pre-configured set of proxies known at the data plane. The protocol proxy could be selected using any suitable mechanism (e.g., using round robin), where the selection could be made from the available proxies, perceived loading of the available proxies, nearest proxy based on perceived transmission latency, etc.

In operation, the data plane would be responsible for providing content to be encoded in a mobile wireless specific protocol. The data plane would also be responsible for understanding content received via a mobile wireless specific protocol, but necessarily not the implementation of the protocol itself. Additionally, the focus on the protocol proxy function removes the need for a mobile wireless specific protocol functionality in the general-purpose router. This may be achieved with the understanding that a suitable general-purpose CP/DP protocol is specified. Additionally, the architecture can include an intelligent selection of a proposed proxy based on any number of criteria. The protocol proxy may be provisioned in any suitable network element discussed herein in this Specification. For example, the protocol proxy may be provided in a router, a switch, a gateway, or any other network element: some of which are illustrated in the previously discussed FIGURES. The protocol proxy may be provisioned as hardware, software, or any suitable combination of these elements. Furthermore, the protocol proxy may be a proprietary device, which can suitably communicate with any network element. The protocol proxy may be distributed at edges of the network in order to alleviate certain processing responsibilities of those network elements downstream of the protocol proxy.

Note that existing solutions embed the implementation of mobile wireless specific protocol usage in the product supporting the mobile wireless gateway data plane. In contrast, the architecture of the present disclosure can be configured to remove the need to do that and, further, shift the proxy to a specialized function. This could allow a general-purpose router to support a single protocol rather than multiple mobile wireless specific protocol usages.

In accordance with one example implementation of the protocol proxy, the protocol used between the data plane function and the protocol proxy can be a single protocol, which would carry information such as User Identifiers, packet and byte counts, fields that would be inserted in charging records or policy responses such as transaction headers, time of connection, information that is generally of use to the backend systems, etc. The protocol proxy could leverage the 'non protocol specific format of the user IDs, or counts . . . ', and package those into the wireless standards specific protocol format (e.g., within a Diameter AVP, a Radius VSA, a GTP' TLV, etc.). The protocol proxy can also be configured to maintain any protocol specific state, session IDs, etc., which may be utilized by the wireless standards-based interface. In certain instances, the information that is passed to the proxy is not a fast path stream, but rather parameters related to (for example) charging record generation or policy responses. It is dissimilar to Radius or Diameter Proxy as the protocol proxy (e.g., it is not a Diameter In: Diameter Out, Radius In: Radius Out function).

In essence, for a given subscriber, information relevant for charging and policy is provided from the data plane element to the protocol proxy element in the form of a generalized protocol. The destination address for the proxy function can be provided on user session establishment. It would be possible for the charging information of some subscriber flows to be sent to one proxy address, where it is formatted into a GTP' record and information for other flows is sent to a proxy for formatting into a record (e.g., suitable for Gy).

Semantically, the control plane can host the charging (e.g., GTP', Gy), policy (e.g., Gx), management (SNMP, command line interface (CLI)), mobile signaling (e.g., GTP, VPN signaling such as LT2P), Authentication, Authorization, Accounting (e.g., Radius interfaces), etc. The data plane can be responsible for forwarding traffic, applying ACLs, QoS functionality, gathering statistics, extracting transaction-related fields from the packet flows for inclusion in charging and reporting records.

Note that with the example flows provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) is readily scalable and further can accommodate a large number of components, as well as more complicated/ sophisticated arrangements and configurations. Accordingly, the examples provided should not limit the scope or inhibit the broad teachings of communication system 10 as potentially applied to a myriad of other architectures.

It is also important to note that the steps in the preceding FIGURES are associated with only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and traffic protocols, communication system 10 may be applicable to other exchanges, routing protocols, or routed protocols in which packets (not necessarily the routing protocol/packets described) are exchanged in order to provide wireless data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

In a separate endeavor, communication system 10 may generally be configured or arranged to represent a 3G architecture applicable to universal mobile telecommunications system (UMTS), Long Term Evolution (LTE), and/or code division multiple access (CDMA) environments in accordance with a particular embodiment. However, these architectures are offered for purposes of example only and may alternatively be substituted with any suitable networking system or arrangement that provides a communicative platform for communication system 10. In other examples, FIG. 1 could readily include a serving general packet radio service (GPRS) support node (SGSN) using a Gn/Gp interface (instead of S3/S4), a gateway GPRS support node (GGSN), any type of network access server (NAS), etc. and all of these elements could interface with an authentication, authorization, and accounting (AAA) server. Moreover, the present disclosure is equally applicable to other cellular, wireless and fixed technologies including Wi-Fi, WiMAX, Femto, DOCSIS, DSL, Ethernet, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method, comprising:
communicating a message from a network element to a remote data plane element in order to request a data plane resource for hosting a session for a particular subscriber, wherein the remote data plane element is designated to host a data plane function for a particular mobile network subscriber and wherein the data plane resource comprises at least one of memory space and processor allocation;
receiving a response at the network element acknowledging the message, wherein data plane traffic is managed at the remote data plane element based on enforcement rules, and wherein the enforcement rules are provisioned in a table element at the remote data plane element, and wherein the table element reflects a portion of a master table element included in the network element; and
communicating subsequent messages to the remote data plane element in order to terminate the session in response to a termination event;
wherein the network element comprises a control plane element for performing control plane functions for the session, including parsing a session create message, interacting with an external policy server, abstracting elements pertinent to the data plane, and controlling which portion of the master table is to be provisioned in the remote data plane element table element;
wherein the remote data plane element comprises a general purpose router for performing data plane functions for the session;
wherein the table element at the remote data plane element includes only enough information for the particular subscriber for mapping flows that are current for the remote data plane element;
wherein the control plane element is divided into a first segment and a second segment in order to utilize resources within a chassis in which the remote data plane element resides; and
wherein the method further comprises:
  discovering nodes capable of supporting the control plane functions;
  discovering nodes capable of supporting the data plane functions for the session; and
  performing a system-specific internal configuration to support separation of the data plane functions and the control plane functions.

2. The method of claim 1, further comprising:
communicating subsequent messages to the remote data plane element in order to:
  update the session in response to a mid-session event.

3. The method of claim 1, wherein a control plane element is configured to be used for session management and call setup support activities associated with the session.

4. The method of claim 1, wherein the remote data plane element maintains a specific subset of enforcement rules to be applied to the session, and wherein at least one of enforcement rules relates to a wireless mobility feature for the session.

5. The method of claim 1, wherein a flow is mapped out of a tunnel against user-specific enforcement rules associated with the session.

6. The method of claim 5, wherein one or more data segments from the tunnel are used in order to map the flow to the user-specific enforcement rules.

7. One or more non-transitory tangible media that includes code for execution and when executed by a processor operable to perform operations comprising:
communicating a message from a network element to a remote data plane element in order to request a data plane resource for hosting a session for a particular subscriber, wherein the remote data plane element is designated to host a data plane function for a particular mobile network subscriber and wherein the data plane resource comprises at least one of memory space and processor allocation;
receiving a response at the network element acknowledging the message, wherein data plane traffic is managed at the remote data plane element based on enforcement rules, and wherein the enforcement rules are provisioned in a table element at the remote data plane element, and wherein the table element reflects a portion of a master table element included in the network element; and
communicating subsequent messages to the remote data plane element in order to terminate the session in response to a termination event;
wherein the network element comprises a control plane element for performing control plane functions for the session, including parsing a session create message, interacting with an external policy server, abstracting elements pertinent to the data plane, and controlling which portion of the master table is to be provisioned in the remote data plane element table element;
wherein the remote data plane element comprises a general purpose router for performing data plane functions for the session;
wherein the table element at the remote data plane element includes only enough information for the particular subscriber for mapping flows that are current for the remote data plane element;
wherein the control plane element is divided into a first segment and a second segment in order to utilize resources within a chassis in which the remote data plane element resides; and
wherein the operations further comprise:
  discovering nodes capable of supporting the control plane functions;
  discovering nodes capable of supporting the data plane functions for the session; and
  performing a system-specific internal configuration to support separation of the data plane functions and the control plane functions.

8. The media of claim 7, the operations further comprising:
communicating subsequent messages to the remote data plane element in order to:
  update the session in response to a mid-session event.

9. The media of claim 7, wherein a control plane element is configured to be used for session management and call setup support activities associated with the session.

10. The media of claim 7, wherein the remote data plane element maintains a specific subset of enforcement rules to be applied to the session, and wherein at least one of enforcement rules relates to a wireless mobility feature for the session.

11. The media of claim 7, wherein a flow is mapped out of a tunnel against user-specific enforcement rules associated with the session.

12. The media of claim 11, wherein one or more data segments from the tunnel are used in order to map the flow to the user-specific enforcement rules.

13. An apparatus, comprising:
a memory element configured to store data;
a mobility module; and
a processor operable to execute instructions associated with the data, a network sensor configured to interface with the memory element and the processor,
wherein the apparatus is configured to:
  communicate a message from a network element to a remote data plane element in order to request a data plane resource for hosting a session for a particular subscriber, wherein the remote data plane element is designated to host a data plane function for a particular mobile network subscriber and wherein the data plane resource comprises at least one of memory space and processor allocation;
  receive a response at the network element acknowledging the message, wherein data plane traffic is managed at the remote data plane element based on enforcement rules, and wherein the enforcement rules are provisioned in a table element at the remote data plane element, and wherein the table element reflects a portion of a master table element included in the network element; and communicate subsequent messages to the remote data plane element in order to terminate the session in response to a termination event;

wherein the network element comprises a control plane element for performing control plane functions for the session, including parsing a session create message, interacting with an external policy server, abstracting elements pertinent to the data plane, and controlling which portion of the master table is to be provisioned in the remote data plane element table element;

wherein the remote data plane element comprises a general purpose router for performing data plane functions for the session; and wherein the table element at the remote data plane element includes only enough information for the particular subscriber for mapping flows that are current for the remote data plane element;

wherein the control plane element is divided into a first segment and a second segment in order to utilize resources within a chassis in which the remote data plane element resides; and wherein the apparatus is further configured to:
discover nodes capable of supporting the control plane functions;
discover nodes capable of supporting the data plane functions for the session;
and perform a system-specific internal configuration to support separation of the data plane functions and the control plane functions.

14. The apparatus of claim 13, wherein a control plane element is configured to be used for session management and call setup support activities associated with the session.

15. The apparatus of claim 13, wherein the remote data plane element maintains a specific subset of enforcement rules to be applied to the session, and wherein at least one of enforcement rules relates to a wireless mobility feature for the session.

16. The apparatus of claim 13, wherein a flow is mapped out of a tunnel against user-specific enforcement rules associated with the session.

17. The apparatus of claim 16, wherein one or more data segments from the tunnel are used in order to map the flow to the user-specific enforcement rules.

18. The apparatus of claim 13, wherein the remote data plane element is provisioned in a line card resident in the chassis and coupled to a server blade.

19. The apparatus of claim 18, wherein additional resources are included in the chassis to support layer 7 (L7) classification operations in the chassis.

20. The apparatus of claim 19, wherein the L7 classification operations are coordinated with a packet transfer activity occurring at a network location proximate to a data center.

21. The apparatus of claim 13, wherein certain flows are communicated from the remote data plane to a deep packet inspection (DPI) capable network element, and wherein the certain flows are communicated back from the DPI capable network element.

\* \* \* \* \*